UNITED STATES PATENT OFFICE.

LEWIS E. SAUNDERS AND RAY HILL WHITE, OF NIAGARA FALLS, NEW YORK, ASSIGNORS TO NORTON COMPANY, OF WORCESTER, MASSACHUSETTS, A CORPORATION OF MASSACHUSETTS.

ALUMINOUS ABRASIVE AND PROCESS OF MAKING THE SAME.

1,263,709.     Specification of Letters Patent.     Patented Apr. 23, 1918.

No Drawing.     Application filed August 2, 1917. Serial No. 184,110.

*To all whom it may concern:*

Be it known that we, LEWIS E. SAUNDERS and RAY HILL WHITE, citizens of the United States, residing at Niagara Falls, in the county of Niagara and State of New York, have invented certain new and useful Improvements in Aluminous Abrasives and Processes of Making the Same, of which the following is a specification.

In U. S. Patent No. 954,808, patented April 12, 1910, to George N. Jeppson and Lewis E. Saunders, there is described an aluminous abrasive in the form of hard and relatively brittle grains possessing a crystalline structure, and consisting of alumina substantially free from fluxing impurities, and more especially from the oxids of iron, titanium, and silicon, which may be regarded as the normal impurities of bauxite. In said patent, it is pointed out that such grains, when assembled by a bond having sufficient strength, possess the property of remaining *in situ* until their cutting points or edges become dulled, and then breaking with a sharp, crisp fracture, giving fresh, keen cutting edges. In the commercial manufacture of abrasives in accordance with the said patent, we have observed that in many cases, and possibly to some extent in all cases, the pig or ingot of solidified alumina presents a more or less porous or cellular structure, showing either cells or channels, or both. This characteristic structure may appear throughout substantially the entire mass of a pig weighing several tons, although it is usually more pronounced in some portions than in others, and in some portions it may not be in evidence at all. Such pigs also in many cases at least, contain a relatively small interior portion having a highly characteristic platy structure, which does not as a rule partake to any marked degree of the cellular character above mentioned. We now believe that this cellular or porous structure of the body of the pig, or of portions thereof, is attributable to the presence in the alumina of a substance or substances existing at the moment of solidification of the mass in the vapor phase.

Another effect which we attribute to a material in the vapor phase has been demonstrated in micro-sections of this crystalline alumina. It is found that the individual alumina crystals, which are of considerable size, say up to one centimeter or more in diameter, are in many instances perforated and usually multi-perforated; a fact which appears clearly to indicate that the substance responsible for the perforations existed in the vapor phase at the time the alumina crystals were forming. From this it would seem to follow that the said substance is probably one of the components of the final product: experience however has shown that in some cases products exhibiting typical evidences of the vapor phase contain only very small proportions of soda or other non-aluminous substances.

A careful chemical study of certain aluminous products exhibiting these indications of the vapor phase has demonstrated the presence therein of a component which is analytically reported as sodium oxid ($Na_2O$). The precise mode of combination of the sodium in the product is not certainly known, but it is most conveniently assumed to be present as sodium aluminate. The fact that the individual crystals are thus perforated is probably the explanation, or an explantion, of the weak structure of grains derived from such crystals. The perforation may also be a factor in determining the excellent bonding qualities of the grains, that is, the tenacity with which they are held in a ceramic or other bond.

Our further researches have now shown that the addition of relatively small proportions of sodium compounds, and as explained below of certain other substances equivalent thereto in this operation, to the charge of aluminous material to be fused may profoundly modify the character of the product resulting from the fusion. For example, sodium carbonate in proportions as small as one per cent. or even less, when added to alumina substantially free from such fluxing impurities as the oxids of silicon and titanium, has the effect of very materially weakening the physical structure of the alumina grain, and yields an abrasive having new characteristics peculiarly advantageous for certain grinding and polishing operations. Abrasives thus prepared possess sufficient hardness for the purposes to which they are applied, but their physical structure is decidedly weaker than that of the abrasive prepared from substantially pure alumina to which no soda has been added. The abrasive so prepared with the soda addition shows pronounced indications of the vapor phase, including the perforation of the alumina crystals as described above.

The weakness of the abrasive appears to be a function of the alkali content. In ordinary practice it is believed that it will not be necessary to add more than about five per cent. of soda, since with this proportion of $Na_2O$ in the product, the structure is sufficiently weak for most purposes; but in case extreme weakness is required, more soda may be added. Other alkali-metal salts or compounds including potassium compounds, are for the purposes of this invention equivalent to the sodium compounds.

Substances other than alkali-metal salts have been found to give the effects described above as characteristic of the existence of the vapor phase at the moment of solidification of the fused mass. For example, the addition of about two per cent. of aluminum flourid to a substantially pure alumina yielded a product of gray color having a strongly marked porous columnar structure, the pores being relatively numerous and of small diameter. The addition of a few per cent. of commercial zinc powder (containing metallic zinc and zinc oxid), yielded a light-colored, columnar product characterized by relatively large smooth-walled cells or pores, and a brilliant, pearly luster. The above and other materials having like effects are therefore to be regarded in this art as equivalents of the sodium salts.

In this connection it may be explained that the efficiency of a grinding-wheel is often expressed as a ratio of the material removed to the wheel wear. At first thought, it might be considered that the weaker the abrasive the less efficient would be the grinding-wheel, inasmuch as the wheel would wear down more rapidly. This however is by no means always the case, for as a rule the weaker the abrasive the more freely the wheel will cut, the less will be the friction, and the less the heat development; so that the amount of material removed may be greater. The increase in the amount of material removed may and often does largely overbalance the rapid wear of the abrasive wheel, so that in many cases there is a marked increase in the efficiency of the grinding-wheel due to the use of a weaker abrasive.

In addition to the efficiency of the grinding operation, the finish is of extreme importance; and it is easy to conceive why the weaker abrasive with its freer cutting action, not burning the work, will produce a superior finish.

Reference has already been made to the fact that aluminous abrasives prepared in accordance with U. S. Patent No. 954,808 have in certain cases contained very small proportions of $Na_2O$, and have exhibited some indications of the vapor phase, as well as a physical structure which is relatively weak as compared with that of an abrasive prepared from bauxite. We now regard it as probable that the above physical characteristics are in some measure at least attributable to the presence (heretofore unrecognized) in such products of small proportions (amounting usually to about 0.3 per cent.) of the component which is analytically reported as $Na_2O$. Commercially pure alumina is often prepared by precipitation methods from sodium aluminate solutions, and persistently retains traces of soda, perhaps as aluminate. In so far as such precipitated alumina may be used or may have been used in the practice of the invention of the said patent, the effects due to soda are, we believe, traceable in the product of fusion. We believe however that the physical effects due to the presence of sodium have not before been recognized.

The alkali metals may under certain conditions yield effects other than those above noted. Thus as we have pointed out in a copending application Serial No. 152,099, filed March 2, 1917, it has now been observed that the platy crystal masses occurring at times in the interior portions of the pig or ingot of substantially pure alumina prepared in accordance with Patent No. 954,808 consist in large part of a crystalline modification of alumina to which the name β-alumina (beta-alumina) has been given, in contradistinction to the crystal form of alumina occurring in nature (corundum, sapphire, ruby, etc.,) and which is also formed when most aluminous materials, including bauxite, are melted in the electric furnace; this heretofore known crystal form of alumina being now for convenience designated α-alumina (alpha-alumina). As also pointed out in the said application it is possible by the addition to an aluminous material substantially free from fluxing impurities of a proper proportion of certain salts or compounds of sodium, potassium of other alkali metals, to produce a pig or ingot wherein any desired proportion, or substantially all, of the alumina exists in the said beta modification. It should be understood however that the weakening of the physical structure of the abrasive is not necessarily dependent upon the production of β-alumina. On the contrary, both this weakening of the grain, and the evidences of the vapor phase, have been observed in products from which β-alumina is either wholly absent or can be identified in only very small proportions. Moreover, the weakening of the grain is pronounced in case the soda or its equivalents is added in sufficient proportions to alumina containing substantial amounts of silica; or to ordinary bauxite containing iron, silica and titanium oxid.

But in these latter cases the beta modification may be entirely absent, even though the percentage of $Na_2O$ in the charge is considerable; nor in such cases is there as a rule any evidence of such effects as have been described above as attributable to the vapor phase.

Iron oxid when present in the alumina appears, on the contrary, to be substantially neutral, the soda additions acting in this case to weaken the grain and likewise when in sufficient quantity to transform the alumina into the beta modification, in practically the same manner as in the case of substantially pure alumina; moreover, in such case evidences of the vapor phase are found.

Although the soda is reported analytically as $Na_2O$, it is of course not necessary to add it in the form of sodium oxid. It may be introduced for example in the form of carbonate, sulfate or aluminate, and probably in the form of many other salts or compounds. Sodium chlorid is decidedly less desirable than the above, as in this case volatilization losses are encountered during the fusion, and but little soda remains in the product.

Analyses of certain abrasives in accordance with this invention and containing material proportions of $Na_2O$ are as follows:—

| $Na_2O$ | $SiO_2$ | $Fe_2O_3$ | $Al_2O_3$ (by difference.) | $Na_2O$ (calculated in charge.) |
|---|---|---|---|---|
| 1.03 | 0.07 | 0.10 | 98.80 | 2.5 |
| 1.80 | 0.02 | 0.14 | 97.71 | 3.3 |
| 2.24 | 0.05 | 0.20 | 97.18 | 3.7 |
| 3.43 | 0.09 | 0.19 | 95.96 | 5.0 |

Similar products containing five per cent. or upward of $Na_2O$ have also been prepared.

It is necessary as a rule, in order to produce a product of fusion having any given percentage of $Na_2O$, to introduce into the charge some excess above the calculated quantity, presumably in order to compensate mechanical losses and losses by volatilization. The excess required will of course depend somewhat upon specific operating conditions, and may vary with the absolute percentage of $Na_2O$. For example, the charges from which the foregoing products were derived were calculated to contain the respective proportions of $Na_2O$ indicated in the final column.

We claim:—

1. A crystalline aluminous abrasive characterized by a relatively weak grain, and by the presence therein of a material proportion of a sodium compound.

2. A crystalline aluminous abrasive characterized by a relatively weak grain, and by the presence therein of a sodium compound in excess of one per cent., calculated as $Na_2O$.

3. A crystalline aluminous abrasive characterized by a relatively weak grain, and by the presence therein of a sodium compound in proportions between one and five per cent. calculated as $Na_2O$.

4. An aluminous abrasive whereof individual crystals are perforated or cellular.

5. An aluminous abrasive whereof individual crystals are perforated or cellular, said abrasive containing a material proportion of a sodium compound.

6. An aluminous abrasive whereof the individual crystals are perforated, said abrasive containing in excess of one per cent. of a sodium compound calculated as $Na_2O$.

7. An aluminous abrasive whereof the individual crystals are perforated, said abrasive containing a sodium compound in proportions between one and five per cent. calculated as $Na_2O$.

8. The hereindescribed process, which consists in mixing with an aluminous material a relatively small proportion of a substance capable of existing in the vapor phase at the moment of solidification of the charge, and fusing the mixture in an electric furnace, producing thereby a product exhibiting evidences of the vapor phase.

9. The hereindescribed process, which consists in mixing with an aluminous material a relatively small proportion of a sodium compound, and fusing the mixture in an electric furnace, producing thereby a product exhibiting evidences of the vapor phase.

10. The hereindescribed process, which consists in mixing with substantially pure alumina a relatively small proportion of a substance capable of existing in the vapor phase at the moment of solidification of the charge, and fusing the mixture in an electric furnace, producing thereby a product exhibiting evidences of the vapor phase.

11. The hereindescribed process, which consists in mixing with substantially pure alumina a relatively small proportion of a sodium compound, and fusing the mixture in an electric furnace, producing thereby a product exhibiting evidences of the vapor phase.

In testimony whereof, we affix our signatures.

LEWIS E. SAUNDERS.
RAY HILL WHITE.